(12) United States Patent
Duncan et al.

(10) Patent No.: US 7,685,519 B1
(45) Date of Patent: Mar. 23, 2010

(54) PROCESS AND APPARATUS FOR PROVIDING A CUSTOMIZABLE CONTENT TOOLTIP

(75) Inventors: David Audley Duncan, Orem, UT (US); Michael Amore Scalora, Orem, UT (US)

(73) Assignee: Intuit Inc., Mountain View, CA (US)

( * ) Notice: Subject to any disclaimer, the term of this patent is extended or adjusted under 35 U.S.C. 154(b) by 733 days.

(21) Appl. No.: 11/489,158

(22) Filed: Jul. 18, 2006

(51) Int. Cl.
  *G06F 3/00* (2006.01)
  *G06F 3/048* (2006.01)
(52) U.S. Cl. .................. 715/711; 715/705; 715/715
(58) Field of Classification Search .......... 715/705–715
See application file for complete search history.

(56) References Cited

U.S. PATENT DOCUMENTS

| | | |
|---|---|---|
| 6,025,841 A * | 2/2000 | Finkelstein et al. ......... 715/803 |
| 2005/0039138 A1* | 2/2005 | Urbina ....................... 715/802 |
| 2005/0050470 A1* | 3/2005 | Hudson et al. .............. 715/711 |

* cited by examiner

*Primary Examiner*—Weilun Lo
*Assistant Examiner*—Truc T Chuong
(74) *Attorney, Agent, or Firm*—Gunnison, McKay & Hodgson, L.L.P.; Philip J. McKay

(57) ABSTRACT

A method and apparatus for providing a customizable content tooltip provides a customizable content tooltip including a customization control that, when activated, allows a user to choose and/or edit the content displayed by the customizable content tooltip.

4 Claims, 17 Drawing Sheets

300A

Create Transaction

Vendor 301
Hometown Hardware

303
Transaction #
1-0001

305
Transaction type
Purchase Order

From
Hometown Hardware
111 First Street
Hometown, Home State
11111
307

To
Customer Number 1
222 Second Street
Hometown, Home State
11111
309

Date 1/1/2007  ACCT. # 1234
311              313

350

| Item | Description | Qty | Rate | Amount |
|---|---|---|---|---|
| Tinting Film | Tinting film, 36" roll | 4 | 78.00 | 312.00 |
| Red Paint | Red Paint, can | 2 | 25.50 | 51.00 |
| Vinyl Flooring | Vinyl Flooring, sheet | 1 | 500.00 | 500.00 |
| Chain | Chain, reel | 4 | 22.50 | 90.00 |
| 351 | 353 | 355 | 357 | 359 |

361 Tinting Film
363 Red Paint
365 Vinyl Flooring
367 Chain

371 Sub-total  953.00
373 Tax         9.53
375 Shipping   00.00
377 Total     962.53

FIG. 3A

Create Transaction

Vendor 301: Hometown Hardware
Transaction # 303: 1-0001
Transaction type 305: Purchase Order From 307:
Hometown Hardware
111 First Street
Hometown, Home State
11111

To 309:
Customer Number 1
222 Second Street
Hometown, Home State
11111

Date 311: 1/1/2007
ACCT. # 313: 1234

350

| | Item (351) | Description (353) | Qty (355) | Rate (357) | Amount (359) |
|---|---|---|---|---|---|
| 361 | Tinting Film | Tinting film, 36" roll | 4 | 78.00 | 312.00 |
| 363 | Red Paint | Red Pa[380] | 2 | 25.50 | 51.00 |
| 365 | Vinyl Flooring | Vinyl | 1 | 50.00 | 500.00 |
| 367 | Chain | Chain, | 4 | 22.50 | 90.00 |

Popup 381A (382A): Brand A film. Grey metallic. 10 foot roll [EDIT] — 384

| | | |
|---|---|---|
| 371 Sub-total | | 953.00 |
| 373 Tax | | 9.53 |
| 375 Shipping | | 00.00 |
| 377 Total | | 962.53 |

Create Transaction

Vendor 301  
[Hometown Hardware]

303  
Transaction #  
[1-0001]

305  
Transaction type  
[Purchase Order]

From  
Hometown Hardware  
111 First Street  
Hometown, Home State  
11111  
307

To  
Customer Number 1  
222 Second Street  
Hometown, Home State  
11111  
309

Date [1/1/2007] ACCT. # [1234]  
311  313

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Pa... Brand A 382A film. Grey metallic. 10 foot roll | 2 | 25.50 | 51.00 |
| 365 | Vinyl Flooring | Vinyl | 1 | 50.00 | 500.00 |
| 367 | Chain | Chain, [EDIT] | 4 | 22.50 | 90.00 |
| | 351 | 353 | 355 | 357 | 359 |

381A  
391A  Brand A film. Grey metallic. 10 foot roll  
384

| | | |
|---|---|---|
| | 371 Sub-total | 953.00 |
| | 373 Tax | 9.53 |
| | 375 Shipping | 00.00 |
| | 377 Total | 962.53 |

Create Transaction

Vendor 301
Hometown Hardware

Transaction # 303
1-0001

Transaction type 305
Purchase Order

From
Hometown Hardware
111 First Street
Hometown, Home State
11111
307

To
Customer Number 1
222 Second Street
Hometown, Home State
11111
309

Date 1/1/2007   ACCT. # 1234
311                313

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Pa Brand A 382A film. Grey metallic. 10 foot roll | 2 | 25.50 | 51.00 |
| 365 | Vinyl Flooring | Vinyl | 1 | 50.00 | 500.00 |
| 367 | Chain | Chain, [EDIT] ◄ | 4 | 22.50 | 90.00 |
| | | 381A  384 391B Brand B film. gold metallic. 15 foot roll | | | |
| | 351 | 353 | 355 | 357 | 359 |

371 Sub-total  953.00
373 Tax        9.53
375 Shipping   00.00
377 Total      962.53

Create Transaction

Vendor 301  
Hometown Hardware

303  
Transaction #  
1-0001

305  
Transaction type  
Purchase Order

From  
Hometown Hardware  
111 First Street  
Hometown, Home State  
11111  
307

To  
Customer Number 1  
222 Second Street  
Hometown, Home State  
11111  
309

Date 1/1/2007   ACCT. # 1234  
311                  313

350

| Item | Description | Qty | Rate | Amount |
|---|---|---|---|---|
| 361 Tinting Film | Tinting film, 36" roll | 380  4 | 78.00 | 312.00 |
| 363 Red Paint | Red Pai[Brand B 382B film. Gold metallic. 15 foot roll] | 2 | 25.50 | 51.00 |
| 365 Vinyl Flooring | Vinyl | 1 | 50.00 | 500.00 |
| 367 Chain | Chain, [EDIT] | 4 | 22.50 | 90.00 |

381B  
384

351   353   355   357   359

371 Sub-total  953.00  
373 Tax  9.53  
375 Shipping  00.00  
377 Total  962.53

FIG. 3E

Create Transaction — 300F

Vendor 301: Hometown Hardware
Transaction # 303: 1-0001
Transaction type 305: Purchase Order From 307:
Hometown Hardware
111 First Street
Hometown, Home State
11111

To 309:
Customer Number 1
222 Second Street
Hometown, Home State
11111

Date 311: 1/1/2007
ACCT. # 313: 1234

350

| Item (351) | Description (353) | Qty (355) | Rate (357) | Amount (359) |
|---|---|---|---|---|
| Tinting Film | Tinting film, 36" roll | 4 | 78.00 | 312.00 | 361 |
| Red Paint | Red Paint, can 380 | 2 | 25.50 | 51.00 | 363 |
| Vinyl Flooring | Vinyl Flooring, sheet | | 50.00 | 500.00 | 365 |
| Chain | Chain, reel | | 2.50 | 90.00 | 367 |

383A

385A: Gallon / Quart / Pint
EDIT — 386

| | | | 371 Sub-total | 953.00 |
| | | | 373 Tax | 9.53 |
| | | | 375 Shipping | 00.00 |
| | | | 377 Total | 962.53 |

Create Transaction

| Vendor 301 | 303 Transaction # | 305 Transaction type |
|---|---|---|
| Hometown Hardware | 1-0001 | Purchase Order |

From
Hometown Hardware
111 First Street
Hometown, Home State
11111
307

To
Customer Number 1
222 Second Street
Hometown, Home State
11111
309

Date 1/1/2007  ACCT. # 1234
311             313

350

| Item | Description | Qty | Rate | Amount |
|---|---|---|---|---|
| 361 Tinting Film | Tinting film, 36" roll | 4 | 78.00 | 312.00 |
| 363 Red Paint | Red Paint, can | 2 | 25.50 | 51.00 |
| 365 Vinyl Flooring | Vinyl Flooring, sheet | 1 | .00 | 500.00 |
| 367 Chain | Chain, reel | 4 | .50 | 90.00 |
| 351 | 353 | 355 | 357 | 359 |

385A
Gallon
Quart
Pint
EDIT
383A
386

393A
5 Gallon
Gallon
1/2 Gallon
Quart
Pint
Ounce

371 Sub-total: 953.00
373 Tax: 9.53
375 Shipping: 00.00
377 Total: 962.53

Create Transaction

Vendor 301: Hometown Hardware
303 Transaction #: 1-0001
305 Transaction type: Purchase Order From 307:
Hometown Hardware
111 First Street
Hometown, Home State
11111

To 309:
Customer Number 1
222 Second Street
Hometown, Home State
11111

Date 311: 1/1/2007    ACCT. # 313: 1234

350

| | Item (351) | Description (353) | Qty (355) | Rate (357) | Amount (359) |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | [385A: Gallon / Quart / Pint] [EDIT] .00 | 500.00 |
| 367 | Chain | Chain, reel | 4 | .50 | 90.00 |

383A
386

393B:
5 Gallon
Gallon
1/2 Gallon
Quart
Pint
Ounce

| | | |
|---|---|---|
| | 371 Sub-total | 953.00 |
| | 373 Tax | 9.53 |
| | 375 Shipping | 00.00 |
| | 377 Total | 962.53 |

FIG. 3H

Create Transaction

Vendor 301: Hometown Hardware
Transaction # 303: 1-0001
Transaction type 305: Purchase Order

From: Hometown Hardware, 111 First Street, Hometown, Home State 11111 (307)

To: Customer Number 1, 222 Second Street, Hometown, Home State 11111 (309)

Date 311: 1/1/2007
ACCT. # 313: 1234

350

| Item | Description | Qty | Rate | Amount |
|---|---|---|---|---|
| 361 Tinting Film | Tinting film, 36" roll | 4 | 78.00 | 312.00 |
| 363 Red Paint | Red Paint, can 380 | 2 | 25.50 | 51.00 |
| 365 Vinyl Flooring | Vinyl Flooring, sheet | 1 | | 500.00 |
| 367 Chain | Chain, reel | 4 | | 90.00 |
| 351 | 353 | 355 | 357 | 359 |

385B: Gallon / 1/2 Gallon / Quart / Pint — EDIT (383B, 386)

371 Sub-total: 953.00
373 Tax: 9.53
375 Shipping: 00.00
377 Total: 962.53

Create Transaction

Vendor 301
Hometown Hardware

303
Transaction #
1-0001

305
Transaction type
Purchase Order

From
Hometown Hardware
111 First Street
Hometown, Home State
11111
307

To
Customer Number 1
222 Second Street
Hometown, Home State
11111
309

Date 1/1/2007   ACCT. # 1234
311                313

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | 500.00 | 500.00 |
| 367 | Chain | Chain, reel | 4 | 22.50 | 90.00 |
| | 351 | 353 | 355 | 357 | 359 |

380
387A
Meter 389A
Centimeter
Yard       388
Foot
Inch
EDIT

371 Sub-total | 953.00
373 Tax | 9.53
375 Shipping | 00.00
377 Total | 962.53

Create Transaction

Vendor 301　　　　303 Transaction #　　　305 Transaction type
[Hometown Hardware]　　[1-0001]　　[Purchase Order]

From
Hometown Hardware
111 First Street    307
Hometown, Home State
11111

To
Customer Number 1
222 Second Street    309
Hometown, Home State
11111

Date [1/1/2007]　ACCT. # [1234]
　311　　　　　　313

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | 500.00 | 500.00 |
| 367 | Chain | Chain, reel | 4 | 22.50 | 90.00 |
| | | 387A | Meter 389A<br>Centimeter<br>Yard　388<br>Foot<br>Inch<br>[EDIT] | | |
| | 351 | 353 | 355 | 357 | 359 |

397A [Meter Centimeter Yard Foot Inch]

371 Sub-total　953.00
373 Tax　9.53
375 Shipping　00.00
377 Total　962.53

FIG. 3K

Create Transaction

Vendor 301: Hometown Hardware
Transaction # 303: 1-0001
Transaction type 305: Purchase Order From 307:
Hometown Hardware
111 First Street
Hometown, Home State
11111

To 309:
Customer Number 1
222 Second Street
Hometown, Home State
11111

Date 311: 1/1/2007    ACCT. # 313: 1234

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | 500.00 | 500.00 |
| 367 | Chain | Chain, reel | 4 | 22.50 | 90.00 |
| | 351 | 353 | 355 | 357 | 359 |

387A

389A:
Meter
Centimeter
Yard
Foot
Inch
EDIT 388

397B:
Meter
Centimeter
Yard
Foot
Inch

371 Sub-total: 953.00
373 Tax: 9.53
375 Shipping: 00.00
377 Total: 962.53

Create Transaction

Vendor 301
Hometown Hardware

303
Transaction #
1-0001

305
Transaction type
Purchase Order

From
Hometown Hardware
111 First Street
Hometown, Home State
11111
307

To
Customer Number 1
222 Second Street
Hometown, Home State
11111
309

Date 1/1/2007   ACCT. # 1234
311                313

350

| | Item | Description | Qty | Rate | Amount |
|---|---|---|---|---|---|
| 361 | Tinting Film | Tinting film, 36" roll | 4 | 78.00 | 312.00 |
| 363 | Red Paint | Red Paint, can | 2 | 25.50 | 51.00 |
| 365 | Vinyl Flooring | Vinyl Flooring, sheet | 1 | 500.00 | 500.00 |
| 367 | Chain | Chain, reel | 4 | 22.50 | 90.00 |
| | 351 | 353 | 355 | 357 | 359 |

380
387B

389B
Yard
Foot     388
Inch
EDIT

371 Sub-total   953.00
373 Tax         9.53
375 Shipping    00.00
377 Total       962.53

FIG. 3M

PROCESS AND APPARATUS FOR PROVIDING A CUSTOMIZABLE CONTENT TOOLTIP

BACKGROUND

As computing systems have increased in capability, decreased in size, and increased in portability, various methods and devices have been developed which allow a user of a computing system, and/or a software application implemented on the computing system, to interface with the computing system and/or software with minimal physical input from the user. Minimization of physical input from the user is particularly advantageous in mobile computing systems, such as laptop systems, handheld systems, PDAs and mobile telephone systems, and commercial computing systems, such as computing systems used for conducting commercial transactions at wholesale and/or retail establishments.

Currently, one device that is often used to minimize physical user input, and to minimize the number of display pages or screenshots the user is required to interact with, is the "tooltip" or "screenTip". A tooltip is a common graphical user interface (GUI) element that typically takes the form of a small box or display window, often having a yellow or gold fill color, which appears near a selected item on a display screen when a user hovers a cursor, typically controlled by a mouse, over the item. Once activated, a tooltip typically shows a more detailed description, information, or an attribute, associated with the selected item. A tooltip typically minimizes physical user input by appearing automatically, without requiring the user to perform another physical action such as clicking a mouse. In addition, use of a tooltip allows multiple layers of content to be displayed in a single display screen without the need for jumping between display screens or web pages.

Currently, tooltips are commonly used in a wide range of programs including various computing system implemented financial management systems such as: computing system implemented business financial management systems; computing system implemented sales and inventory tracking systems; computing system implemented tax preparation systems; computing system implemented business accounting systems; and computing system implemented medical expense management systems; as well as various other electronic transaction data driven financial management systems. Tooltips are also commonly used in conjunction with other software applications, operating systems and Web browsers.

The list of possible uses for tooltips is virtually endless and includes use with any item where a more detailed description of the item, or its attributes, information, or equivalents, is helpful. For instance, in the context of the business financial management system, a display item might typically include an inventory item. In this instance, when a cursor is hovered over the display representation of the inventory item a tooltip may appear that shows, as an example, any or the following: the amount of the item in common units associated with the item; the cost of the item; the sale price of the item; various colors or styles of the item available; how long the item has been in inventory; how many of the units of the item are in inventory; or virtually any other attribute associated with the item, such as a general description of the item, an average cost of an item, a first-in/first-out cost of an item, and a last-in/first-out cost of an item.

Currently, tooltips are provided by the developers of hardware systems, software systems and web pages as relatively static elements that, once created, are typically not easily editable or customizable by the user. Consequently, the description, information, or attribute of an item that is displayed via the tooltip is the description, information, or attribute that the creator of the tooltip felt most users would require at the time of creation. Of course, this means that many descriptions, information, and attributes displayed by current tooltips are irrelevant to, or at least of lesser importance to, some users. However, since currently the tooltip content cannot be easily changed or edited by the user, the user is often forced to accept the tooltip as provided, whether helpful or not.

SUMMARY

In accordance with one embodiment, a method and apparatus for providing a customizable content tooltip includes a customizable content tooltip and a process for providing a customizable content tooltip.

In one embodiment, the method and apparatus for providing a customizable content tooltip disclosed herein provides a customizable content tooltip including a customization control that, when activated, allows a user to choose and/or edit the content displayed by the customizable content tooltip.

In one embodiment, a customizable content tooltip includes a customization control in the form of a button or other symbol displayed as part of the customizable content tooltip. In one embodiment, when the customization control is activated, an editable content window is displayed showing either an editable version of the text displayed by the customizable content tooltip or an editable list of information and or attributes that can be displayed by the customizable content tooltip.

In one embodiment, once the customizable content tooltip content window is displayed, a user can take any of several actions to customize the customizable content tooltip content such as: editing text shown; rearranging the listing order in which information or attributes are listed by the customizable content tooltip; adding an item to an information or attribute list of the customizable content tooltip; deleting an item from the information or attribute list of the customizable content tooltip; or otherwise editing and/or customizing the content displayed by the customizable content tooltip.

In one embodiment, once the customizable content tooltip content is edited and/or customized as desired, the customization control is then de-activated and the customizable content tooltip content window is closed. Then, according to one embodiment, whenever the customizable content tooltip is activated, the customizable content tooltip displays the edited content.

Using the method and apparatus for providing a customizable content tooltip disclosed herein, a user is provided with the capability to easily tailor the content displayed by the customizable content tooltip to the needs of that particular user. Consequently using the method and apparatus for providing a customizable content tooltip disclosed herein, the tooltip function is made more useful, efficient, and user-friendly and the parent hardware and software system implementing the customizable content tooltip is more likely to be employed, and valued, by the user.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3A is a representation of a display screen layout associated with specific examples of one embodiment of a customizable content tooltip resulting from the implementation of one embodiment of a process for providing a customizable content tooltip;

FIGS. 3B, 3C, 3D and 3E are display screen layouts associated with a specific example of one embodiment of a customizable content tooltip resulting from the implementation of one embodiment of a process for providing a customizable content tooltip;

FIGS. 3F, 3G, 3H and 3I are display screen layouts associated with a specific example of one embodiment of a customizable content tooltip resulting from the implementation of one embodiment of a process for providing a customizable content tooltip;

FIGS. 3J, 3K, 3L and 3M are display screen layouts associated with a specific example of one embodiment of a customizable content tooltip resulting from the implementation of one embodiment of a process for providing a customizable content tooltip;

Figure 1:
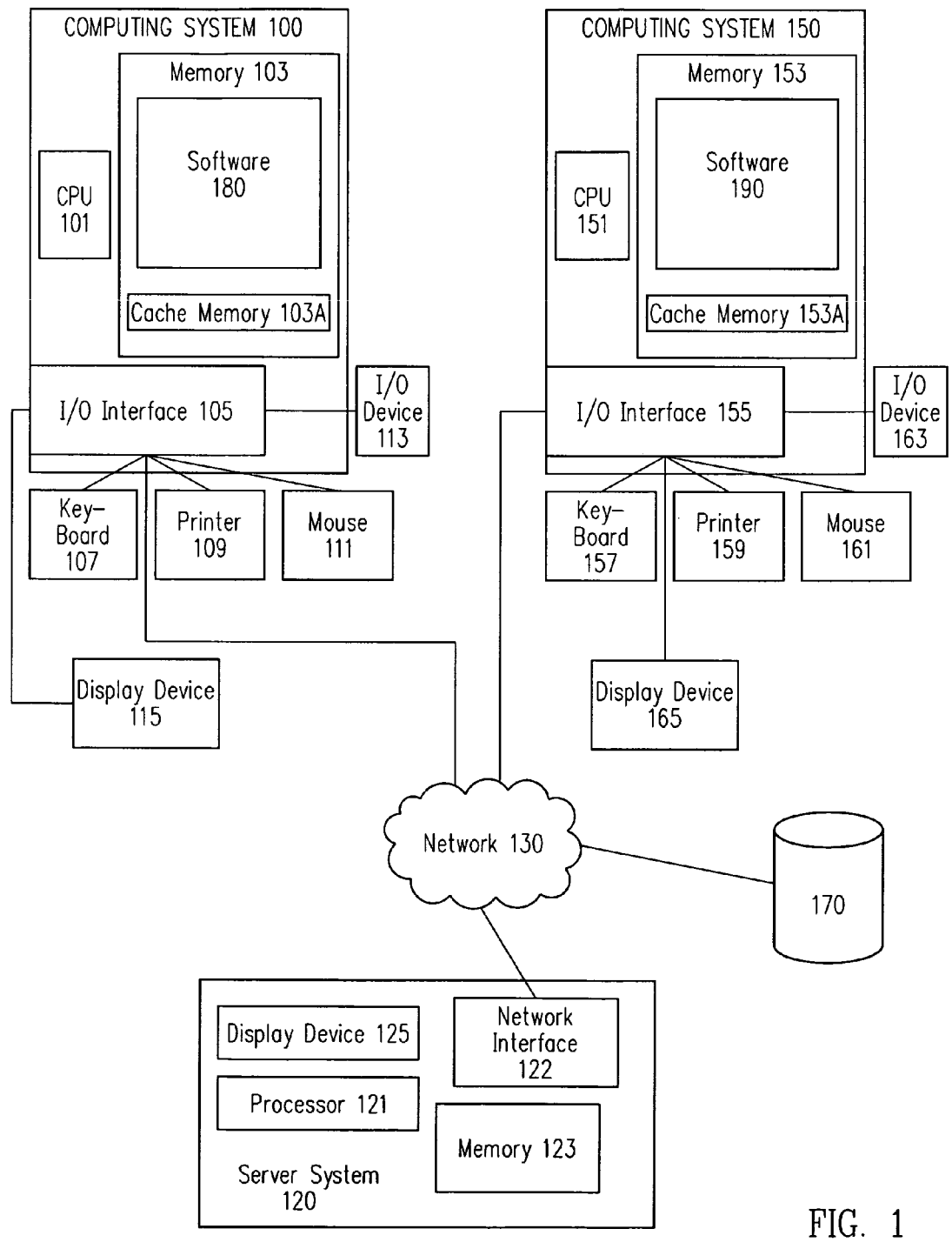
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In addition, the particular display screen layouts, appearance, and terminology as depicted and described herein, are intended to be illustrative and exemplary only, and in no way limit the scope as claimed.

Figure 2:
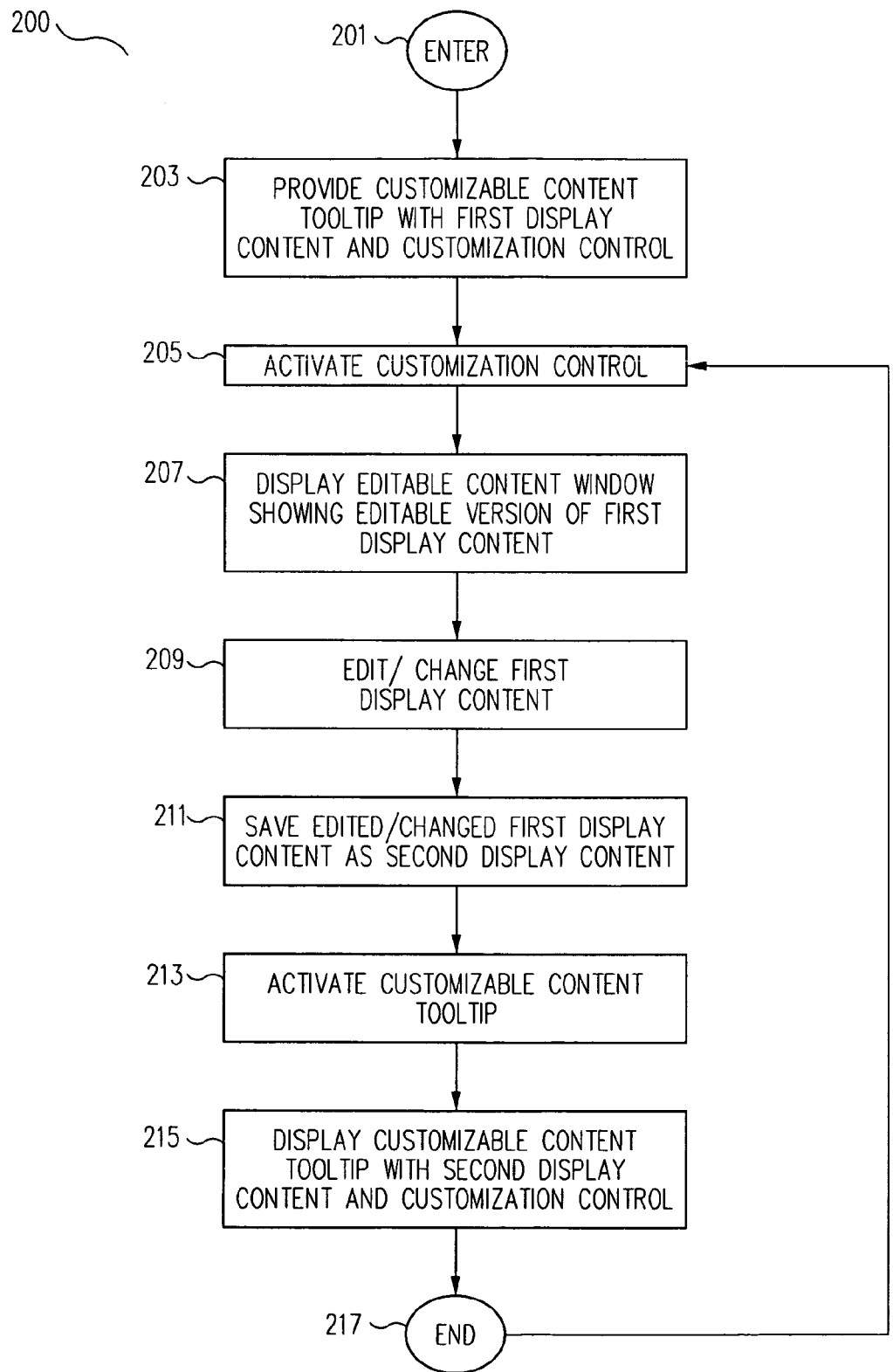
FIG. 2 is a flow chart depicting a process for providing a customizable content tooltip in accordance with one embodiment.

In accordance with one embodiment, a method and apparatus for providing a customizable content tooltip includes a customizable content tooltip and a process for providing a customizable content tooltip (200 in FIG. 2).

In one embodiment, the method and apparatus for providing a customizable content tooltip disclosed herein provides a customizable content tooltip (381A in FIG. 3B, 381B in FIG. 3E, 383A in FIG. 3F, 383B in FIG. 3I, 387A in FIG. 3J and 387B in FIG. 3M) including a customization control (382 in FIG. 3B, 386 in FIG. 3F and 388 in FIG. 3J) that, when activated, allows a user to choose and/or edit the content displayed by the customizable content tooltip.

In one embodiment, a customizable content tooltip includes a customization control, in one embodiment, in the form of a button or other symbol displayed as part of the customizable content tooltip.

In one embodiment, when the customization control is activated, an editable content window (391A in FIG. 3C, 391B in FIG. 3D, 393A in FIG. 3G, 393B in FIG. 3H, 397A in FIG. 3K and 397B in FIG. 3L) is displayed showing either a editable version of the text displayed by the customizable content tooltip or an editable list of information that can be displayed by the customizable content tooltip.

In one embodiment, once the customizable content tooltip content window is displayed, a user can take any of several actions to customize the customizable content tooltip content such as: editing text shown; rearranging the order in which information or attributes are listed by the customizable content tooltip; adding an item to the information or attribute list of the customizable content tooltip; deleting an item from the information or attribute list of the customizable content tooltip; or otherwise editing and/or customizing the content of the customizable content tooltip.

In one embodiment, once the customizable content tooltip content is edited and/or customized as desired, the customization control is de-activated and the customizable content tooltip content window is closed. Then, according to one embodiment, whenever the tooltip is activated, the customized and/or edited content is displayed by the customizable content tooltip.

Using the method and apparatus for providing a customizable content tooltip disclosed herein, a user is provided with the capability to easily tailor the content displayed by the customizable content tooltip to the needs of that particular user. Consequently using the method and apparatus for providing a customizable content tooltip disclosed herein, the tooltip function is made more useful, efficient, and user-friendly and the parent hardware and/or software system implementing the customizable content tooltip is more likely to be employed, and valued, by the user.

As used herein, the term computing system implemented financial management system includes, but is not limited to: computing system implemented business systems, packages, programs, modules, or applications; computing system implemented inventory and sales tracking systems, packages, programs, modules, or applications; computing system implemented personal and small business financial management systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether available or known at the time of filing or as developed later.

For illustrative purposes, embodiments are described within the framework of, and using, one or more computing system implemented financial management systems. However, those of skill in the art will recognize that embodiments can be implemented within various other frameworks including, but not limited to, web pages, web-based systems, general software and hardware systems and devices, and virtually any computing system or computing system implemented application or system, that uses, or could use, tooltips. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian® OS, Windows® Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via a network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the customizable content tooltip, the process for providing a customizable content tooltip, and/or a parent system implementing the customizable content tooltip and/or process for providing a customizable content tooltip, described herein make use of input provided to the customizable content tooltip, the process for providing a customizable content tooltip, and/or a parent system implementing the customizable content tooltip and/or process for providing a customizable content tooltip, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a method and apparatus for providing a customizable content tooltip, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented software applications 180 stored, in whole, or in part, therein, that are used by, or include, as discussed below, a process and/or application for providing a customizable content tooltip, such as process 200 and/or application 401 discussed below. Computing system implemented software application 180 can be any software application, program, module, system, or package including, but not limited to, a general software application, an operating system, a web page generation system and/or software, web page or web-based content, or a computing system implemented financial management system, that interact with, make use of, generate, or otherwise include, a tooltip function.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process and/or application for providing a customizable content tooltip, such as process 200 and/or application 401, and a computing system implemented software application 180, can be loaded, in whole, or in part, into computing system 100 via I/O device 113, such as from a CD, DVD or floppy disk containing all, or part, of computing system implemented software application 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented software application 190 stored, in whole, or in part, therein, that are used by, or include, as discussed below, a process and/or application for providing a customizable content tooltip, such as process 200 and/or application 401.

Computing system implemented software application 190 can be any software application, program, module, system, or package including, but not limited to, any general software application, an operating system, a web page generation system and/or software, web page or web-based content, or a computing system implemented financial management system, that interact with, make use of, generate, or otherwise include, a tooltip function.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process and/or application for providing a customizable content tooltip, such as process 200 and/or application 401, and a computing system implemented software application 190, can be loaded, in whole, or in part, into computing system 150 via I/O device 163, such as from a CD, DVD or floppy disk containing all, or part, of computing system implemented software application 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process and/or application for providing a customizable content tooltip, such as process 200 and/or application 401, and/or computing system implemented software application 180 and/or computing system implemented software application 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process and/or application for providing a customizable content tooltip, such as process 200 and/or application 401, and a computing system implemented software application 180 and/or computing system implemented software application 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process and/or application for providing a customizable content tooltip, such as process 200 and/or application 401, and a computing system implemented software application 180 and/or computing system implemented software application 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing a customizable content tooltip, such as process for providing a customizable content tooltip 200, and/or an application for providing a customizable content tooltip, such as application for providing a customizable content tooltip 401, and a computing system implemented software application, such as computing system implemented software applications 180 and 190, are sometimes referred to herein, alternatively, as a process, an application, a module, a program, a web-page, a web function, a component of a software system, a component of a software package, a component of a parent system, or a feature of a parent system, this terminology is illustrative only. In some embodiments, a process and/or application for providing a customizable content tooltip, such as process 200 and/or application 401, and a computing system implemented software application, such as computing system implemented software applications 180 and 190, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process and/or application for providing a customizable content tooltip, such as process 200 and/or application 401, and a computing system implemented software application, such as computing system implemented software applications 180 and 190, discussed herein, by processor 101, processor 151, or server system processor 121, results in the operations of an agent computer process (not shown) and/or a rule computer process (not shown).

In one embodiment, a process and/or application for providing a customizable content tooltip, such as process 200 and/or application 401, and a computing system implemented software application, such as computing system implemented software applications 180 and 190, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removed from the computing system.

For example, all, or part, of a process and/or application for providing a customizable content tooltip, such as process 200 and/or application 401, and a computing system implemented software application, such as computing system implemented software applications 180 and 190, discussed herein, may be stored in a memory that is physically located in a location, such as server system memory 123, or database 170, of FIG. 1, different from a computing system, such as computing systems 100 and/or 150 of FIG. 1, utilizing a process and/or application for providing a customizable content tooltip, such as process 200 and/or application 401, and a computing system implemented software application, such as computing system implemented software applications 180 and 190. In one embodiment, all, or part, of a process and/or application for providing a customizable content tooltip, such as process 200 and/or application 401, and a computing system implemented software application, such as computing system implemented software applications 180 and 190, discussed herein, may be stored in a memory that is physically located separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server system, such as computing systems 100 and/or 150 and/or server system 120 of FIG. 1, running and/or utilizing and/or storing all, or part, of a process and/or application for providing a customizable content tooltip, such as process 200 and/or application 401, and a computing system implemented software application, such as computing system implemented software applications 180 and 190, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process and/or application for providing a customizable content tooltip, such as process 200 and/or application 401, and a computing system implemented software application, such as computing system implemented software applications 180 and 190, discussed herein, in accordance with at least one of the embodiments as described herein. Similarly, in another embodiment, a process and/or application for providing a customizable content tooltip, such as process 200 and/or application 401, and a computing system implemented software application, such as computing system implemented software applications 180 and 190, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In one embodiment, a process for providing a customizable content tooltip provides a customizable content tooltip including a customization control that, when activated, allows a user to choose and/or edit the content displayed by the customizable content tooltip.

FIG. 2 is a flow chart depicting a process for providing a customizable content tooltip 200 in accordance with one embodiment. Process for providing a customizable content tooltip 200 begins at ENTER OPERATION 201 and process flow proceeds to PROVIDE CUSTOMIZABLE CONTENT TOOLTIP WITH FIRST DISPLAY CONTENT AND CUSTOMIZATION CONTROL OPERATION 203.

At PROVIDE CUSTOMIZABLE CONTENT TOOLTIP WITH FIRST DISPLAY CONTENT AND CUSTOMIZATION CONTROL OPERATION 203 a customizable content tooltip is provided to a user, typically associated with the selected item within the context of a larger display screen. In one embodiment, the customizable content tooltip is provided in response to a user action through a user interface device such as keyboard 107, 157, mouse 111, 161 of FIG. 1, or a touchpad, voice command recognition system, or any other device capable of providing user input to a computing system or for translating user actions into computing system operations, whether available or known at the time of filing or as developed later. In one embodiment, the user action comprises manipulating a mouse, such as mouse 111, 161 of FIG. 1 to move a cursor over a selected item and hovering the cursor over the selected item. In one embodiment, the hovering of the cursor over the selected item causes a customizable content tooltip associated with that item to appear.

In one embodiment, the customizable content tooltip includes first display content. In one embodiment, the first display content includes one or more of: a text description of the associated selected item; attributes associated with the associated selected item in either text form or list form; or any other information about the associated selected item.

In one embodiment, the customizable content tooltip also includes a customization control. In one embodiment, the customization control is in the form of a button or other symbol displayed within the tooltip display content. In other embodiments, the customization control is not a visible button or symbol but is a function activated by a user performing one or more designated actions such pressing a designated key, clicking a mouse button a designated number of times, issuing a user voice command, or any other designated form of user input. In other embodiments, the customization control feature is accessed via one or more layers of pull down menu such as a tools menu, a preferences menu, an options menu, an items menu, a tooltip menu, or any other pull down menu function. In other embodiments, the customization control feature is accessed by any other display means and any other designated form of user input for interacting with those means.

One embodiment of a customizable content tooltip with first display content and customization control as provided at PROVIDE CUSTOMIZABLE CONTENT TOOLTIP WITH FIRST DISPLAY CONTENT AND CUSTOMIZATION CONTROL OPERATION 203 is shown in FIG. 3B. Shown in FIG. 3B is cursor 380 shown as hovering, or otherwise activating, customizable content tooltip 381A. As also shown in FIG. 3B, customizable content tooltip 381A includes first display content 382A that, in this example, is text providing a description of the selected inventory transaction 361 item "tinting film". Also shown in FIG. 3B is customization control 384 which, in this example, takes the form of an "EDIT" button. FIG. 3B, along with the various other elements shown in FIG. 3B, is discussed in more detail below with respect to a specific example of the implementation of one embodiment of a process for providing a customizable content tooltip 200.

Another example of a customizable content tooltip with first display content and customization control as provided at PROVIDE CUSTOMIZABLE CONTENT TOOLTIP WITH FIRST DISPLAY CONTENT AND CUSTOMIZATION CONTROL OPERATION 203 is shown in FIG. 3F. Shown in FIG. 3F is cursor 380 shown as hovering, or otherwise activating, customizable content tooltip 383A. As also shown in FIG. 3F, customizable content tooltip 383A includes first display content 385A that, in this example, is list of container sizes associated with the selected inventory transaction 363 item "Red Paint". Also shown in FIG. 3F is customization control 386 which, in this example, takes the form of an "EDIT" button. FIG. 3F, along with the various other elements shown in FIG. 3F, is discussed in more detail below with respect to a specific example of the implementation of one embodiment of a process for providing a customizable content tooltip 200.

Another example of a customizable content tooltip with first display content and customization control as provided at PROVIDE CUSTOMIZABLE CONTENT TOOLTIP WITH FIRST DISPLAY CONTENT AND CUSTOMIZATION CONTROL OPERATION 203 is shown in FIG. 3J. Shown in FIG. 3J is cursor 380 shown as hovering, or otherwise activating, customizable content tooltip 387A. As also shown in FIG. 3J, customizable content tooltip 387A includes first display content 389A that, in this example, is list of lengths associated with the selected inventory transaction 367 item "Chain". Also shown in FIG. 3J is customization control 388 which, in this example, takes the form of an "EDIT" button. FIG. 3J, along with the various other elements shown in FIG. 3J, is discussed in more detail below with respect to a specific example of the implementation of one embodiment of a process for providing a customizable content tooltip 200.

Returning to FIG. 2, the customization control, such as customization controls 384, 386 and 388 of FIGS. 3B, 3F and 3J, provided at PROVIDE CUSTOMIZABLE CONTENT TOOLTIP WITH FIRST DISPLAY CONTENT AND CUSTOMIZATION CONTROL OPERATION 203 of FIG. 2 is, in one embodiment, a button or other symbol that is activated by user action through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

In other embodiments, the customization control is not a visible button or symbol but is a function activated by a user performing one or more designated actions such pressing a designated key, clicking a mouse button a designated number of times, issuing a user voice command, or any other designated form of user input through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later. In other embodiments, the customization control feature is accessed via one or more layers of pull down menu such as a tools menu, a preferences menu, an options menu, an items menu, a tooltip menu, or any other pull down menu function, whether available or known at the time of filing or as developed later. In other embodiments, the customization control feature is accessed by any other display means or function, whether available or known at the time of filing or as developed later, and any other designated form of user input for interacting with those means, whether available or known at the time of filing or as developed later.

As discussed in more detail below, in one embodiment, the customization control, such as customization controls 384, 386 and 388 of FIGS. 3B, 3F and 3J, is linked to an editable version of the first display content and/or a listing of attributes of the selected item associated with the customizable content tooltip.

Methods, structures, and apparatuses for linking data representing edible versions of text and/or listing of items, such as attributes, to a graphical user interface object such as a tooltip are well-known to those of skill in the art. Consequently a more detailed discussion of methods, structures and apparatuses for linking data representing edible versions of text and/or lists of items/attributes is omitted here to avoid detracting from the invention.

In one embodiment, once a customizable content tooltip with first display content and customization control, such as customizable content tooltip 381A of FIG. 3B, customizable content tooltip 383A of FIG. 3F, and customizable content tooltip 387A of FIG. 3J, is provided at PROVIDE CUSTOMIZABLE CONTENT TOOLTIP WITH FIRST DISPLAY CONTENT AND CUSTOMIZATION CONTROL OPERATION 203, process flow proceeds to ACTIVATE CUSTOMIZATION CONTROL OPERATION 205.

At ACTIVATE CUSTOMIZATION CONTROL OPERATION 205, the customization control, such as customization controls 384, 386 and 388 of FIGS. 3B, 3F and 3J, is activated, as discussed above, by the user. In one embodiment, the customization control is activated in response to a user action through a user interface device such as keyboard, such as keyboard 107, 157, or mouse, such as mouse 111, 161 of FIG. 1 or a touchpad, voice command recognition system, or any other device capable of providing user input to a computing system or for translating user actions into computing system operations, whether available or known at the time of filing or as developed later. In one embodiment, the user action comprises manipulating a mouse, such as mouse 111, 161 of FIG. 1 and "clicking" a button on the mouse.

In other embodiments, the customization control is not a visible button or symbol but is a function activated by a user performing one or more designated actions such pressing a designated key, clicking a mouse button a designated number of times, issuing a user voice command, or any other designated form of user input through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later. In other embodiments, the customization control feature is accessed via one or more layers of pull down menu such as a tools menu, a preferences menu, an options menu, an items menu, a tooltip menu, or any other pull down menu function, whether available or known at the time of filing or as developed later. In other embodiments, the customization control feature is accessed by any other display means or function, whether available or known at the time of filing or as developed later, and any other designated form of user input for interacting with those means, whether available or known at the time of filing or as developed later.

Returning to FIG. 2, in one embodiment, once the customization control, such as customization controls 384, 386 and 388 of FIGS. 3B, 3F and 3J, is activated at ACTIVATE CUSTOMIZATION CONTROL OPERATION 205, process flow proceeds to DISPLAY EDITABLE CONTENT WINDOW SHOWING EDITABLE VERSION OF FIRST DISPLAY CONTENT OPERATION 207.

At DISPLAY EDITABLE CONTENT WINDOW SHOWING EDITABLE VERSION OF FIRST DISPLAY CONTENT OPERATION 207 an editable content window showing an editable version of the first display content of PROVIDE CUSTOMIZABLE CONTENT TOOLTIP WITH FIRST DISPLAY CONTENT AND CUSTOMIZATION CONTROL OPERATION 203 is displayed and provided to the user.

One example of an editable content window is shown in FIG. 3C. As shown in FIG. 3C, customization control 384 of customizable content tooltip 381A has been activated at ACTIVATE CUSTOMIZATION CONTROL OPERATION 205 and editable content window 391A is displayed at DISPLAY EDITABLE CONTENT WINDOW SHOWING EDITABLE VERSION OF FIRST DISPLAY CONTENT OPERATION 207. In this particular example, editable content window 391A shows an editable copy of the text of first display content 382A. FIG. 3C, along with the various other elements shown in FIG. 3C, is discussed in more detail below with respect to a specific example of the implementation of one embodiment of a process for providing a customizable content tooltip 200.

Another example of an editable content window in accordance with one embodiment is shown in FIG. 3G. As shown in FIG. 3G, customization control 386 of customizable content tooltip 383A has been activated at ACTIVATE CUSTOMIZATION CONTROL OPERATION 205 and editable content window 393A is displayed at DISPLAY EDITABLE CONTENT WINDOW SHOWING EDITABLE VERSION OF FIRST DISPLAY CONTENT OPERATION 207. In this particular example, editable content window 393A shows an editable copy of the list of first display content 385A. FIG. 3G, along with the various other elements shown in FIG. 3G, is discussed in more detail below with respect to a specific example of the implementation of one embodiment of a process for providing a customizable content tooltip 200.

Another example of an editable content window is shown in FIG. 3K. As shown in FIG. 3K, customization control 388 of customizable content tooltip 387A has been activated at ACTIVATE CUSTOMIZATION CONTROL OPERATION 205 and editable content window 397A is displayed at DISPLAY EDITABLE CONTENT WINDOW SHOWING EDITABLE VERSION OF FIRST DISPLAY CONTENT OPERATION 207. In this particular example, editable content window 397A shows an editable copy of the list of first display content 389A.

As discussed above, methods, structures, and apparatuses for linking data representing edible versions of text and/or listing of items, such as editable content windows 391A, 393A and 397A, to a graphical user interface object, such as customizable content tooltip 381A, customizable content tooltip 383A, and customizable content tooltip 387A, of FIGS. 3C, 3G and 3K, respectively, are well-known to those of skill in the art. Consequently a more detailed discussion of methods, structures and apparatuses for linking data representing edible versions of text and/or lists of items/attributes is omitted here to avoid detracting from the invention.

Returning to FIG. 2, once an editable content window, such as editable content windows 391A, 393A and 397A of FIGS. 3C, 3G and 3K, respectively, is displayed at DISPLAY EDITABLE CONTENT WINDOW SHOWING EDITABLE VERSION OF FIRST DISPLAY CONTENT OPERATION 207 of FIG. 2, process flow proceeds to EDIT/CHANGE FIRST DISPLAY CONTENT OPERATION 209.

At EDIT/CHANGE FIRST DISPLAY CONTENT OPERATION 209 a user is provided with the opportunity to edit or change the editable version of the first display content displayed in the editable content window, such as editable content windows 391A, 393A and 397A of FIGS. 3C, 3G and 3K, respectively. In one embodiment, the user changes or edits the editable version of the first display content displayed in the editable content window through a user interface device such as keyboard, such as keyboard 107, 157, or mouse, such as mouse 111, 161 of FIG. 1 or a touchpad, voice command recognition system, or any other device capable of providing user input to a computing system or for translating user actions into computing system operations, whether available or known at the time of filing or as developed later.

FIG. 3D shows one embodiment of an editable content window 391B after a user has edited the text of the editable version of first display content 382A displayed in editable content window 391A of FIG. 3C. Referring to both FIGS. 3C and 3D, in this particular example, the user has changed the text "Brand A" and "10 foot roll" of first display content 382A in editable content window 391A of FIG. 3C to "Brand B" and "15 foot roll" in editable content window 391B of FIG. 3D. FIG. 3D, along with the various other elements shown in FIG. 3D, is discussed in more detail below with respect to a specific example of the implementation of one embodiment of a process for providing a customizable content tooltip 200.

FIG. 3H shows one embodiment of an editable content window 393B after a user has edited the editable version of first display content 385A displayed in editable content window 393A of FIG. 3G to select the container size "½ Gallon". Referring to both FIGS. 3G and 3H, in this particular example, the user has selected the container size ½ Gallon in editable content window 393A of FIG. 3H to be added to the display content listing. FIG. 3H, along with the various other elements shown in FIG. 3H, is discussed in more detail below with respect to a specific example of the implementation of one embodiment of a process for providing a customizable content tooltip 200.

FIG. 3L shows one embodiment of an editable content window 397B after a user has edited the editable version of first display content 389A displayed in editable content window 397A of FIG. 3K to select the metric lengths "Meter" and "Centimeter". Referring to both FIGS. 3K and 3L, in this particular example, the user has selected the metric lengths Meter and Centimeter in editable content window 397B of FIG. 3L to be deleted from the display content listing. FIG. 3L, along with the various other elements shown in FIG. 3L, is discussed in more detail below with respect to a specific example of the implementation of one embodiment of a process for providing a customizable content tooltip 200.

In one embodiment, once a user is provided with the opportunity to edit or change the editable version of the first display content displayed in the editable content window, such as editable content windows 391A, 393A and 397A of FIGS. 3C, 3G and 3K, respectively, at EDIT/CHANGE FIRST DISPLAY CONTENT OPERATION 209 of FIG. 2, process flow proceeds to SAVE EDITED/CHANGED FIRST DISPLAY CONTENT AS SECOND DISPLAY CONTENT OPERATION 211.

At SAVE EDITED/CHANGED FIRST DISPLAY CONTENT AS SECOND DISPLAY CONTENT OPERATION 211, the edits and/or changes made at EDIT/CHANGE FIRST DISPLAY CONTENT OPERATION 209 are saved as the new, or second, display content displayed and/or making up the customizable content tooltip of process for providing a customizable content tooltip 200.

In one embodiment, the data representing the edited and/or changed new, or second, display content displayed and/or making up the customizable content tooltip of process for providing a customizable content tooltip 200 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by the provider of a parent system employing a process for providing a customizable content tooltip, such as process 200 (FIG. 2), such as computing system implemented software applications 180 and 190 of FIG. 1; a web-page or web-service provider employing a process for providing a customizable content tooltip such as process 200 (FIG. 2); the provider of a process for providing a customizable content tooltip such as process 200; or any other parties.

In one embodiment, once the edits and/or changes made at EDIT/CHANGE FIRST DISPLAY CONTENT OPERATION 209 are saved as the new, or second, display content displayed and/or making up the customizable content tooltip of process for providing a customizable content tooltip 200 at SAVE EDITED/CHANGED FIRST DISPLAY CONTENT AS SECOND DISPLAY CONTENT OPERATION 211, process flow proceeds to ACTIVATE CUSTOMIZABLE CONTENT TOOLTIP OPERATION 213.

At ACTIVATE CUSTOMIZABLE CONTENT TOOLTIP OPERATION 213, the customizable content tooltip of SAVE EDITED/CHANGED FIRST DISPLAY CONTENT AS SECOND DISPLAY CONTENT OPERATION 211 is activated in response to a user action through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later. In one embodiment, the user action comprises manipulating a mouse, such as mouse 111, 161 of FIG. 1 to move a cursor over a selected item and hovering the cursor over the selected item. In one embodiment, the hovering of the cursor over the selected item causes a customizable content tooltip associated with that item to appear.

In one embodiment, once the customizable content tooltip of SAVE EDITED/CHANGED FIRST DISPLAY CONTENT AS SECOND DISPLAY CONTENT OPERATION 211 (FIG. 2) is activated at ACTIVATE CUSTOMIZABLE CONTENT TOOLTIP OPERATION 213, process flow proceeds to DISPLAY CUSTOMIZABLE CONTENT TOOLTIP WITH SECOND DISPLAY CONTENT AND CUSTOMIZATION CONTROL OPERATION 215.

At DISPLAY CUSTOMIZABLE CONTENT TOOLTIP WITH SECOND DISPLAY CONTENT AND CUSTOMIZATION CONTROL OPERATION 215, the customizable content tooltip of process for providing a customized content tooltip 200 is displayed including the second display content of SAVE EDITED/CHANGED FIRST DISPLAY CONTENT AS SECOND DISPLAY CONTENT OPERATION 211 as well a customization control for any further/future edits or changes.

FIG. 3E shows an example of one embodiment of a customizable content tooltip 381B displayed at DISPLAY CUSTOMIZABLE CONTENT TOOLTIP WITH SECOND DISPLAY CONTENT AND CUSTOMIZATION CONTROL OPERATION 215. As shown in FIG. 3E, customizable content tooltip 381B includes display content 382B that is a copy of the edited display content of editable content window 391B of FIG. 3D. Consequently, customizable content tooltip 381B of FIG. 3E is the user edited version of customizable content tooltip 381A of FIG. 3B. FIG. 3E, along with the various other elements shown in FIG. 3E, is discussed in more detail below with respect to a specific example of the implementation of one embodiment of a process for providing a customizable content tooltip 200.

FIG. 3I shows another example of one embodiment of a customizable content tooltip 383B displayed at DISPLAY CUSTOMIZABLE CONTENT TOOLTIP WITH SECOND DISPLAY CONTENT AND CUSTOMIZATION CONTROL OPERATION 215. As shown in FIG. 3I, customizable content tooltip 383B includes display content 385B that is a copy of the edited display content of editable content window 393B of FIG. 3H. Consequently, customizable content tooltip 383B of FIG. 3I is the user edited version of customizable content tooltip 383A of FIG. 3G. FIG. 3I, along with the various other elements shown in FIG. 3I, is discussed in more detail below with respect to a specific example of the implementation of one embodiment of a process for providing a customizable content tooltip 200.

FIG. 3M shows another example of one embodiment of a customizable content tooltip 387B displayed at DISPLAY CUSTOMIZABLE CONTENT TOOLTIP WITH SECOND DISPLAY CONTENT AND CUSTOMIZATION CONTROL OPERATION 215. As shown in FIG. 3M, customizable content tooltip 387B includes display content 389B that is a copy of the edited display content of editable content window 397B of FIG. 3L. Consequently, customizable content tooltip 387B of FIG. 3M is the user edited version of customizable content tooltip 387A of FIG. 3J. FIG. 3M, along with the various other elements shown in FIG. 3M, is discussed in more detail below with respect to a specific example of the implementation of one embodiment of a process for providing a customizable content tooltip 200.

In one embodiment, once the customizable content tooltip of process for providing a customized content tooltip 200 is displayed, including the second display content of SAVE EDITED/CHANGED FIRST DISPLAY CONTENT AS SECOND DISPLAY CONTENT OPERATION 211, as well a customization control for any further/future edits or changes, at DISPLAY CUSTOMIZABLE CONTENT TOOLTIP WITH SECOND DISPLAY CONTENT AND CUSTOMIZATION CONTROL OPERATION 215, process flow proceeds to END OPERATION 217.

At END OPERATION 217 process for providing a customizable content tooltip 200 is exited and/or process for providing a customizable content tooltip 200 returns to ACTIVATE CUSTOMIZATION CONTROL OPERATION 205 to await the next round of edits.

In some embodiments, some, or all, of the data associated with, created by, processed by, used by, or modified by, a process for providing a customizable content tooltip, such as process 200, the operation thereof and/or various displays, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by the provider of a parent system employing a process for providing a customizable content tooltip such as process 200, such as computing system implemented software applications 180 and 190 of FIG. 1; a web-page or web-service provider employing a process for providing a customizable content tooltip such as process 200 (FIG. 2); the provider of a process for providing a customizable content tooltip such as process 200; or any other parties.

Using process for providing a customizable content tooltip 200, and the resultant customizable content tooltip, disclosed herein, a user is provided with the capability to tailor the content displayed by the customizable content tooltip to the needs of that particular user. Consequently using the method and apparatus for providing a customizable content tooltip disclosed herein, the tooltip function is made more useful, efficient, and user-friendly and the parent hardware and software system implementing the customizable content tooltip is more likely to be employed, and valued, by the user.

FIGS. 3B, 3C, 3D and 3E are display screen layouts associated with one specific example of the operation of one embodiment of process for providing a customizable content tooltip 200. Likewise, FIGS. 3F, 3G, 3H and 3I are display screen layouts associated with another specific example of the operation of one embodiment of process for providing a customizable content tooltip 200. Likewise, FIGS. 3J, 3K, 3L and 3M are display screen layouts associated with another specific example of the operation of one embodiment of process for providing a customizable content tooltip 200.

Each of FIGS. 3B, 3C, 3D and 3E and FIGS. 3F, 3G, 3H and 3I and 3J, 3K, 3L and 3M include, or are built upon, the same base screen layout 300A of FIG. 3A. Consequently, the various elements of base screen layout 300A of FIG. 3A, and therefore of similar elements in FIGS. 3B, 3C, 3D and 3E and FIGS. 3F, 3G, 3H and 3I and 3J, 3K, 3L and 3M are described below.

FIG. 3A is a representation of one embodiment of a display screen layout 300A in accordance with one embodiment of process for providing a customizable content tooltip 200. As seen in FIG. 3A, in one example, display screen layout 300A is an electronic representation of a purchase order, as it might be generated using a computing system implemented financial management system implementing process for providing a customizable content tooltip 200.

Those of skill in the art will readily recognize that while an electronic representation of a purchase order was chosen for illustrative purposes, display screen layout 300A could be, in other embodiments, any electronic representation and/or screen layout where a tooltip that provides information, or attributes, associated with a selected item displayed in the display screen layout is, or can be, used.

In addition, the choice of a computing system implemented financial management system for implementing process for providing a customizable content tooltip 200 was chosen for illustrative purposes only and any computing system implemented software application, such as computing system implemented software applications 180 and 190 of FIG. 1 could be used, including, but not limited to, any software application, program, module, system, or package, a general software application, an operating system, a web page generation system and/or software, or web page or web-based content, that interact with, make use of, generate, or otherwise include, a tooltip function As seen in FIG. 3A, in one embodiment, display screen layout 300A includes: vendor window 301, listing the vendor "Hometown Hardware" in this example; transaction# window 303, listing the transaction number "1-0001", in this example; transaction type window 305, showing, as discussed above, that this example of display screen layout 300A is a "purchase order"; from window 307, showing the vendor Hometown Hardware and its address; to window 309, showing the address of the customer, "Customer Number 1" in this example; date window 311; acct# window 313, showing the account number for Customer Number 1 in this example; and inventory item transaction register 350.

As also seen in FIG. 3A, inventory item transaction register 350 includes: inventory item transactions 361, 363, 365, and 367; item column 351, were a representation of inventory items such as "tinting film", "red paint", "vinyl flooring" and "chain" is displayed; description column 353, where description of the inventory items of item column 351 is displayed; rate column 357 showing the price per unit of measure for the inventory items listed in item column 351; amount column 359, showing a subtotal cost associated with each inventory item transaction listed in item column 351; subtotal window 371; tax window 373; shipping window 375; and total window 377.

As also seen in FIG. 3A, display screen layout 300A also includes Qty column 355 where selected quantities of inventory items are entered by a user in units of measure associated with each of the inventory items.

In the one specific example shown in FIG. 3A, inventory item transaction 361 involves the inventory item "tinting film" as shown in item column 351 and as described in description column 353 as tinting film, 36" roll. The selected quantity of the inventory item tinting film of inventory item transaction 361 in this particular example is 4, as shown in Qty column 355, representing a selected quantity of 4 rolls. As also shown in FIG. 3A, inventory item transaction 361 includes an entry of 78.00 in rate column 357 representing a cost of $78.00 per roll. Amount column 359 includes the entry 312.00 for inventory item transaction 361, representing a total cost of $312.00 for the selected quantity of 4 rolls of inventory item tinting film.

Similarly, in the one specific example shown in FIG. 3A, inventory item transaction 363 involves the inventory item "red paint" as shown in item column 351 and as described in description column 353 as red paint, can. The selected quantity of the inventory item red paint of inventory item transaction 363 in this particular example is 2, as shown in Qty column 355, representing a selected quantity of 2 cans. As also shown in FIG. 3A, inventory item transaction 363 includes an entry of 25.50 in rate column 357 representing a cost of $25.50 per can of red paint. Amount column 359 includes the entry 51.00 for inventory item transaction 363, representing a total cost of $51.00 for the selected quantity of 2 cans of inventory item red paint.

Similarly, in the one specific example shown in FIG. 3A, inventory item transaction 365 involves the inventory item "vinyl flooring" as shown in item column 351 and as described in description column 353 as vinyl flooring, sheet. The selected quantity of the inventory item vinyl flooring of inventory item transaction 365 in this particular example is 1, as shown in Qty column 355, representing a selected quantity of 1 sheet. As also shown in FIG. 3A, inventory item transaction 365 includes an entry of 500.00 in rate column 357 representing a cost of $500.00 per sheet of vinyl flooring. Amount column 359 includes the entry 500.00 for inventory item transaction 365, representing a total cost of $500.00 for the selected quantity of 1 sheet of vinyl flooring.

Similarly, in the one specific example shown in FIG. 3A, inventory item transaction 367 involves the inventory item "chain" as shown in item column 351 and as described in description column 353 as chain, reel. The selected quantity of the inventory item chain of inventory item transaction 367 in this particular example is 4, as shown in Qty column 355, representing a selected quantity of 4 reels. As also shown in FIG. 3A, inventory item transaction 367 includes an entry of 22.50 in rate column 357 representing a cost of $22.50 per reel of chain. Amount column 359 includes the entry 90.00 for inventory item transaction 365, representing a total cost of $90.00 for the selected quantity of 4 reels of chain.

Also shown in the one specific example of FIG. 3A, inventory item transaction register 350 includes subtotal window 371, with an entry of 953.00 representing a total inventory item cost of $953.00, and tax window 373, with an entry of 9.53 representing a 10% tax cost of $9.53. In this specific example, the customer is picking up the purchase so shipping window 375 includes the entry 00.00. Finally, total window 377 includes the entry 962.53 representing the entire purchase order cost of $962.53.

Many of the elements shown in display screen layout 300A of FIG. 3A can use, and would benefit from, a customizable content tooltip such as would result from application of process for providing a customizable content tooltip 200 of FIG. 2. Consequently, the particular items chosen for the specific examples of the operation of one embodiment of process for providing a customizable content tooltip 200 below are illustrative only and various other items and/or elements could have been chosen. Consequently, the specific choice of items for the specific examples of the operation of one embodiment of process for providing a customizable content tooltip 200 below do not limit the scope as set forth in the claims below.

FIGS. 3B, 3C, 3D and 3E are display screen layouts associated with a specific example of one embodiment of a customizable content tooltip 381A/381B resulting from implementation of one embodiment of a process for providing a customizable content tooltip 200 of FIG. 2. FIG. 3B shows a display screen layout 300B including one embodiment of a customizable content tooltip 381A with first display content 382A and customization control 384 as would be provided at PROVIDE CUSTOMIZABLE CONTENT TOOLTIP WITH FIRST DISPLAY CONTENT AND CUSTOMIZATION CONTROL OPERATION 203 of FIG. 2. Shown in FIG. 3B is cursor 380 hovering, or otherwise activating, customizable content tooltip 381A. As also shown in FIG. 3B, customizable content tooltip 381A includes first display content 382A that, in this example, is text elaborating on a description of the selected inventory transaction 361 item "tinting film". Also shown in FIG. 3B is customization control 384 which, in this example, takes the form of an "EDIT" button.

FIG. 3C shows a display screen layout 300C including one example of an editable content window 391A as it would be displayed once customization control 384 is activated at ACTIVATE CUSTOMIZATION CONTROL OPERATION 205 of FIG. 2 by any of the means discussed above. As discussed above, editable content window 391A of FIG. 3C is displayed at DISPLAY EDITABLE CONTENT WINDOW SHOWING EDITABLE VERSION OF FIRST DISPLAY CONTENT OPERATION 207. In this particular example of FIG. 3C, editable content window 391A shows an editable copy of the text of first display content 382A. Those of skill in the art will readily recognize that, in some embodiments, editable content window 391A need not be a separate window display but, in some embodiments, editable content window 391A may replace or overlay customizable content tooltip 381A and first display content 382A in a single display screen. In addition, editable content window 391A can take many different forms in other embodiments with the only common element being that editable content window 391A provides a capability to edit or change some portion of customizable content tooltip 381A and first display content 382A.

FIG. 3D shows a display screen layout 300D including one embodiment of a editable content window 391B after a user has edited the text of the editable version of first display content 382A displayed in editable content window 391A FIG. 3C at EDIT/CHANGE FIRST DISPLAY CONTENT OPERATION 209 of FIG. 2. Referring to both FIGS. 3C and 3D, in this particular example, the user has changed the text "Brand A" and "10 foot roll" of first display content 382A in editable content window 391A of FIG. 3C to "Brand B" and "15 foot roll" in editable content window 391B of FIG. 3C. In this particular example, the change made in editable content window 391A may reflect a new product or supplier.

As discussed above, the edits and/or changes made at EDIT/CHANGE FIRST DISPLAY CONTENT OPERATION 209 of FIG. 2 are saved at SAVE EDITED/CHANGED FIRST DISPLAY CONTENT AS SECOND DISPLAY CONTENT OPERATION 211.

FIG. 3E shows an example of a display screen layout 300E including one embodiment of a customizable content tooltip 381B with new, or second, content display 382B displayed at DISPLAY CUSTOMIZABLE CONTENT TOOLTIP WITH SECOND DISPLAY CONTENT AND CUSTOMIZATION CONTROL OPERATION 215. As shown in FIG. 3E, customizable content tooltip 381B includes display content 382B that is a copy of the edited display content of editable content window 391B of FIG. 3D and has become the new, or second, a customizable content tooltip 381B (FIG. 3E) to be displayed once customizable content tooltip 381B is activated at ACTIVATE CUSTOMIZABLE CONTENT TOOLTIP OPERATION 213 of FIG. 2. Consequently, customizable content tooltip 381B of FIG. 3E is the user edited version of customizable content tooltip 381A of FIG. 3B.

FIGS. 3F, 3G, 3H and 3I are display screen layouts associated with a specific example of one embodiment of a customizable content tooltip 383A/383B resulting from the implementation of one embodiment of a process for providing a customizable content tooltip 200. FIG. 3F shows a display screen layout 300F including one embodiment of a customizable content tooltip 383A with first display content 385A and customization control 386 as would be provided at PROVIDE CUSTOMIZABLE CONTENT TOOLTIP WITH FIRST DISPLAY CONTENT AND CUSTOMIZATION CONTROL OPERATION 203 of FIG. 2. Shown in FIG. 3F is cursor 380 hovering, or otherwise activating, customizable content tooltip 383A. As also shown in FIG. 3F, customizable content tooltip 383A includes first display content 385A that, in this example, is a list of container sizes associated with the inventory transaction 363 item "Red Paint". Also shown in FIG. 3F is customization control 386 which, in this example, takes the form of an "EDIT" button.

FIG. 3G shows a display screen layout 300G including one example of an editable content window 393A as it would be displayed once customization control 386 is activated at ACTIVATE CUSTOMIZATION CONTROL OPERATION 205 of FIG. 2 by any of the means discussed above. As discussed above, editable content window 393A of FIG. 3G is displayed at DISPLAY EDITABLE CONTENT WINDOW SHOWING EDITABLE VERSION OF FIRST DISPLAY CONTENT OPERATION 207. In this particular example of FIG. 3G, editable content window 393A shows an editable copy of the list of first display content 385A. As discussed above, editable content window 393A can take many different forms in other embodiments with the only common element being that editable content window 393A provides a capability to edit or change some portion of customizable content tooltip 383A and first display content 385A.

FIG. 3H shows a display screen layout 300H including one embodiment of a editable content window 393B as a user is editing the list of the editable version of first display content 385A displayed in editable content window 393A FIG. 3G at EDIT/CHANGE FIRST DISPLAY CONTENT OPERATION 209 of FIG. 2. Referring to both FIGS. 3G and 3H, in this particular example, the user has selected the new container or "can" size ½ Gallon in editable content window 393B of FIG. 3H to be added to the display content 385tA list. In one embodiment the new container size is added by selecting the new container size, in this embodiment ½ Gallon, and then performing a second user action using a user interface device, such as depressing the enter key on a keyboard such as keyboard 107, 157 of FIG. 1. In this particular example, the user may wish to add the new container size based on new inventory or a new product offering.

As discussed above, the edits and/or changes made at EDIT/CHANGE FIRST DISPLAY CONTENT OPERATION 209 of FIG. 2 are saved at SAVE EDITED/CHANGED FIRST DISPLAY CONTENT AS SECOND DISPLAY CONTENT OPERATION 211.

FIG. 3I shows an example of a display screen layout 300I including one embodiment of a customizable content tooltip 383B with new, or second, content display 385B displayed at DISPLAY CUSTOMIZABLE CONTENT TOOLTIP WITH SECOND DISPLAY CONTENT AND CUSTOMIZATION CONTROL OPERATION 215 of FIG. 2. As shown in FIG. 3I, customizable content tooltip 383B includes display content 385B that is a copy of the edited display content of editable content window 393B of FIG. 3D and has become the new, or second, customizable content tooltip 383B to be displayed once the a customizable content tooltip 383B is activated at ACTIVATE CUSTOMIZABLE CONTENT TOOLTIP OPERATION 213 of FIG. 2. Consequently, customizable content tooltip 383B of FIG. 3I is the user edited version of customizable content tooltip 383A of FIG. 3F.

FIGS. 3J, 3K, 3L and 3M are display screen layouts associated with a specific example of one embodiment of a customizable content tooltip 387A/387B resulting from one embodiment of a process for providing a customizable content tooltip 200. FIG. 3J shows a display screen layout 300J including one embodiment of a customizable content tooltip 387A with first display content 389A and customization control 388 as would be provided at PROVIDE CUSTOMIZABLE CONTENT TOOLTIP WITH FIRST DISPLAY CONTENT AND CUSTOMIZATION CONTROL OPERATION 203 of FIG. 2. Shown in FIG. 3J is cursor 380 hovering, or otherwise activating, customizable content tooltip 387A. As also shown in FIG. 3J, customizable content tooltip 387A includes first display content 389A that, in this example, is list of length units associated with the selected inventory transaction 367 item "Chain". Also shown in FIG. 3J is customization control 388 which, in this example, takes the form of an "EDIT" button.

FIG. 3K shows a display screen layout 300K including one example of an editable content window 397A as it would be displayed once customization control 388 is activated at ACTIVATE CUSTOMIZATION CONTROL OPERATION 205 of FIG. 2 by any of the means discussed above. As discussed above, editable content window 397A of FIG. 3K is displayed at DISPLAY EDITABLE CONTENT WINDOW SHOWING EDITABLE VERSION OF FIRST DISPLAY CONTENT OPERATION 207. In this particular example of FIG. 3K, editable content window 397A shows an editable copy of the list of first display content 389A. As discussed above, editable content window 397A can take many different forms in other embodiments with the only common element being that editable content window 397A provides a capability to edit or change some portion of customizable content tooltip 387A and first display content 389A.

FIG. 3L shows a display screen layout 300L including one embodiment of a editable content window 397B as a user is editing the list of the editable version of first display content 389A displayed in editable content window 397A FIG. 3K at EDIT/CHANGE FIRST DISPLAY CONTENT OPERATION 209 of FIG. 2. Referring to both FIGS. 3K and 3L, in this particular example, the user has selected the metric length units Meter and Centimeter in editable content window 397A of FIG. 3L to be deleted from the display content listing.

In one embodiment the metric length units Meter and Centimeter are deleted by selecting the metric length units Meter and Centimeter and then performing a second user action using a user interface device, such as depressing the delete key on a keyboard such as keyboard 107, 157 of FIG. 1. In this particular example, the user may wish to delete the metric length units Meter and Centimeter due to location or customer base in a standard American units region.

As discussed above, the edits and/or changes made at EDIT/CHANGE FIRST DISPLAY CONTENT OPERATION 209 of FIG. 2 are saved at SAVE EDITED/CHANGED FIRST DISPLAY CONTENT AS SECOND DISPLAY CONTENT OPERATION 211.

FIG. 3M shows an example of a display screen layout 300M including one embodiment of a customizable content tooltip 387B with new, or second, content display 389B as displayed at DISPLAY CUSTOMIZABLE CONTENT TOOLTIP WITH SECOND DISPLAY CONTENT AND CUSTOMIZATION CONTROL OPERATION 215 of FIG. 2. As shown in FIG. 3M, customizable content tooltip 387B includes display content 389B that is a copy of the edited display content of editable content window 397B of FIG. 3L and has become the new, or second, customizable content tooltip 387B to be displayed once the customizable content tooltip 387B is activated at ACTIVATE CUSTOMIZABLE CONTENT TOOLTIP OPERATION 213 of FIG. 2. Consequently, customizable content tooltip 387B of FIG. 3M is the user edited version of customizable content tooltip 387A of FIG. 3J.

Those of skill in the art will recognize that the choice of information displayed, the organization of the information displayed, and the manner in which the information is displayed in FIGS. 3A, 3B, 3C, 3D., 3E, 3F, 3G, 3H, 3I, 3J, 3K, 3L, and 3M was made for illustrative purposes only and that other types of information, organization of that information, and manner of displaying the information, can be implemented without departing from the scope as set forth in the claims below. In addition, those of skill in the art will readily recognize that various means for interfacing with, activating, or editing, the information displayed on display screen layouts 300A, 300B, 300C, 300D, 300E, 300F, 300G, 300H, 300I, 300J, 300K, 300L and, 300M of FIGS. 3A, 3B, 3C, 3D., 3E, 3F, 3G, 3H, 3I, 3J, 3K, 3L, and 3M are possible, and that the specific means discussed above do not limit the scope as set forth in the claims below.

Software Architecture

Figure 4:
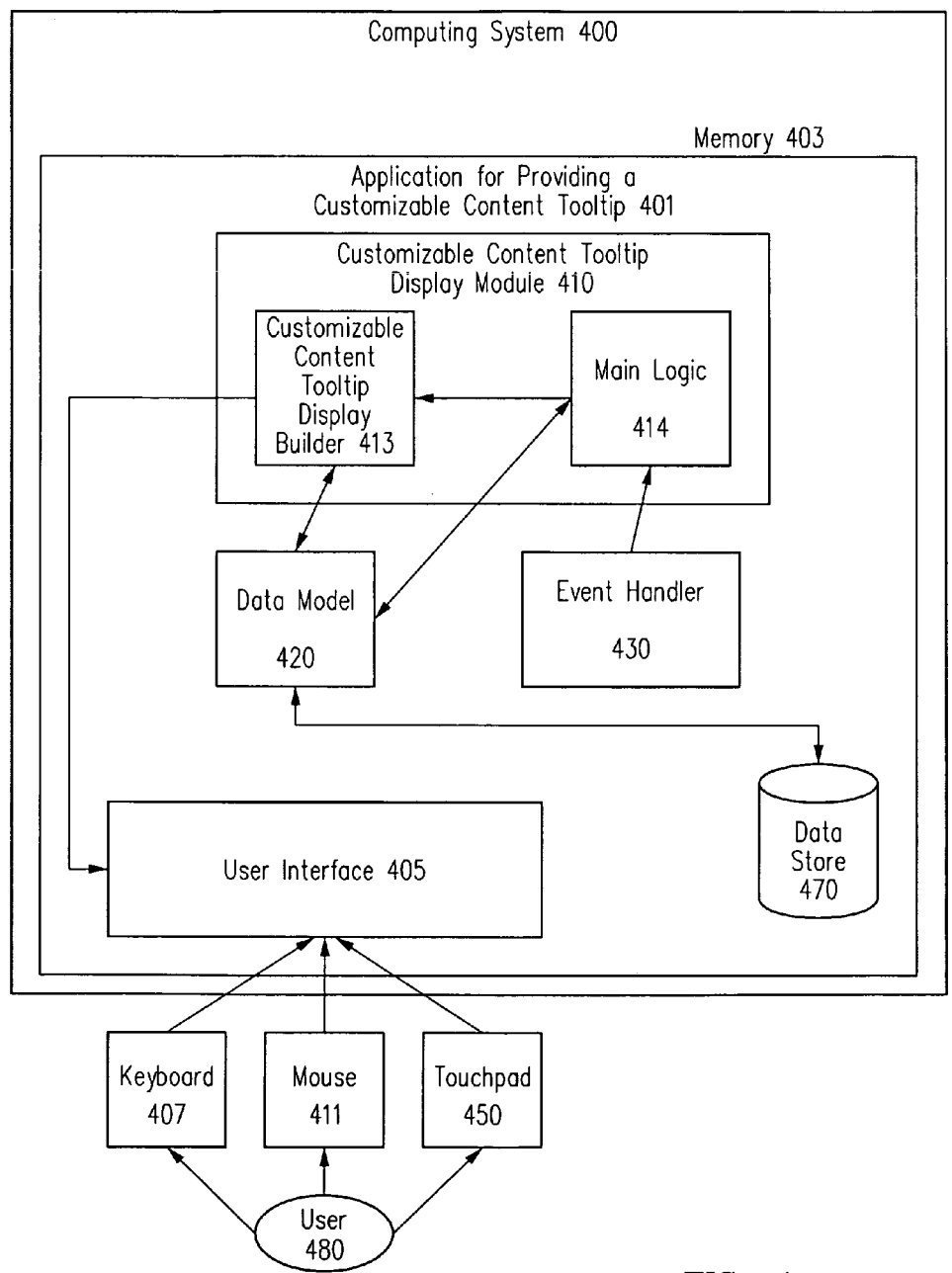
FIG. 4 shows one embodiment of a software architecture for implementing one embodiment.

FIG. 4 shows one embodiment of a software architecture for implementing one embodiment. Shown in FIG. 4 is a computing system 400. In one embodiment, computing system 400 is similar to computing systems 100 and 150 of FIG. 1 discussed above.

Computing system 400 includes application for providing a customizable content tooltip 401. In one embodiment, all, or part of, application for providing a customizable content tooltip 401 resides in a memory 403, such as: memory systems 103, 153 or server memory system 123, or database 170, of FIG. 1; a cache memory, such as cache memory 103A or 153A of FIG. 1; and/or any main memory or mass memory associated with a computing device, such as computing device 400, or computing systems 100 and 150 described above. In one embodiment, all, or part of, application for providing a customizable content tooltip 401 resides in any computing device and/or server system, such as computing systems 400, 100, 150, or server system 120, or other device, in another location, or on/in a computer readable medium, and/or any other computer program product, as defined herein. In one embodiment, all, or part of, application for providing a customizable content tooltip 401 resides in a webpage or in a web-based system. Embodiments of application for providing a customizable content tooltip 401 may be included as add-on software for existing software programs, packages, or applications, and embodiments may be a feature of an application that is bundled with a computing device or sold separately. Some embodiments may also be implemented as functionality embedded in hardware devices and systems.

As shown in FIG. 4, in one embodiment, application for providing a customizable content tooltip 401 includes: customizable content tooltip display module 4110, including customizable content tooltip display builder 413 and main logic 414; data model module 420; event handler 430; data store 470 and user interface 405.

In one embodiment, user interface devices such as keyboard 407, mouse 411, and touchpad 450 are operatively coupled to user interface 405, and application for providing a customizable content tooltip 401. In other embodiments, other user interface devices such as such as trackballs, joysticks, tablets, and "nipples", or any other device capable of providing user input to a computing system and/or application, or for translating user actions into computing system operations and/or application operations, whether available or known at the time of filing or as developed later, are used in place of, or in combination with, user interface devices 407, 411 and 450. User interface devices 407, 411 and 450 and user interface 405, provide a user 480 with an interface to application for providing a customizable content tooltip 401. In one embodiment, interface 405 includes display screen layouts, such as display screen layouts 300A, 300B, 300C, 300D, 300E, 300F, 300G, 300H, 300I, 300J, 300K, 300L, and 300M of FIGS. 3A, 3B, 3C, 3D, 3E, 3F, 3G, 3H, 3I, 3J, 3K, 3L, and 3M, respectively.

In one embodiment, data store 470 is operatively coupled to data model module 420 of application for providing a customizable content tooltip 401. In one embodiment, data store 470 is a memory system, such as memory systems 103, 153 or server memory system 123, or database 170, of FIG. 1, or a cache memory, such as cache memory 103A or 153A of FIG. 1, or any main memory or mass memory, associated with a computing device, such as computing systems 100 and 150 described above. In one embodiment, data store 470 is a designated server system or computing device, or a designated portion of a server system or computing device, such as systems 100, 150 and 120. In one embodiment, data store 470 is relational database or a dedicated mass storage device implemented in software, hardware, or a combination of hardware and software. In one embodiment, data store 470 a webpage or a web-based system.

In one embodiment, application for providing a customizable content tooltip 401 includes a number of executable code portions and data files. These include code for creating and supporting a user interface, such as user interface 405, code for editing and/or changing customizable content tooltips, as well as code for generating customizable content tooltips, such as customizable content tooltips 381A/381B, 383A/383B, 387A/387B, content window displays, such as content display windows 391A/391B, 393A/393B, and 397A/397B on display screens, such as display screen layouts 300A, 300B, 300C, 300D, 300E, 300F, 300G, 300H, 300I, 300J, 300K, 300L, and 300M of FIGS. 3A, 3B, 3C, 3D, 3E, 3F, 3G, 3H, 3I, 3J, 3K, 3L, and 3M, respectively, discussed above. In one embodiment, application for providing a customizable content tooltip 401 of FIG. 4 is responsible for orchestrating the operation of a process and/or application for providing a customizable content tooltip, such as process 200 and/or application 401 of FIG. 2 discussed above. As discussed above, application for providing a customizable content tooltip 401 of FIG. 4 includes customizable content tooltip display module 410, which in turn includes customizable content tooltip display builder 413 and main logic 414.

Customizable content tooltip display module 410, customizable content tooltip display builder 413, and main logic 414 need not be discrete software modules. The particular software architecture of FIG. 4 is shown for illustrative purposes. Consequently, those of skill in the art will recognize that other configurations are contemplated by, and are within the scope of, the present invention as claimed below and the invention may be practiced and implemented using numerous other architectures and in numerous other environments.

In one embodiment, data store 470 includes data displayed in content window displays, such as content display windows 391A/391B, 393A/393B, and 397A/397B and any edits thereto by user 480, and/or a computing system implemented software system, such as computing system implemented software systems 180 and 190 of FIG. 1, and/or application for providing a customizable content tooltip 401 of FIG. 4. In one embodiment, customizable content tooltip display module 410 includes various components that operate together to implement application for providing a customizable content tooltip 401. In one embodiment, user interface 405 displays customizable content tooltips, such as customizable content tooltips 381A/381B, 383A/383B, 387A/387B, content window displays, such as content display windows 391A/391B, 393A/393B, and 397A/397B on display screens, such as display screen layouts 300A, 300B, 300C, 300D, 300E, 300F, 300G, 300H, 300I, 300J, 300K, 300L, and 300M of FIGS. 3A, 3B, 3C, 3D, 3E, 3F, 3G, 3H, 3I, 3J, 3K, 3L, and 3M, respectively, discussed above on a user's display device, such as display devices 115, 165 and 125, discussed above with respect to FIG. 1.

Returning to FIG. 4, in one embodiment, event handler 430 detects user interaction with any of the user interface devices such as keyboard 407, mouse 411, and touchpad 450 and notifies the other components of the interaction. In one embodiment, main logic 414 orchestrates the generation and display of customizable content tooltips, such as customizable content tooltips 381A/381B, 383A/383B, 387A/387B, content window displays, such as content display windows 391A/391B, 393A/393B, and 397A/397B on display screens, such as display screen layouts 300A, 300B, 300C, 300D, 300E, 300F, 300G, 300H, 300I, 300J, 300K, 300L, and 300M of FIGS. 3A, 3B, 3C, 3D, 3E, 3F, 3G, 3H, 3I, 3J, 3K, 3L, and 3M, respectively, discussed above, including requesting data from, and sending data to, other components of customizable content tooltip display module 410.

In one embodiment, customizable content tooltip display builder 413 accepts as input data, the parameters specifying for example, the data displayed in customizable content tooltips and content window displays, on display screens.

Returning to FIG. 4, in one embodiment, based on these parameters and data, customizable content tooltip display builder 413 then creates a customizable content tooltip display on user interface 405. In one embodiment, data model module 420 retrieves the customizable content tooltip data from data store 470 and provides the data to the other components, such as customizable content tooltip display builder 413.

As noted above, the architecture of FIG. 4 represents but one possible implementation of a application for providing a customizable content tooltip 401 and other embodiments, such as one in which the elements of the invention are implemented on a computer, or computing device other than the user's computing device, or one with different components and/or organization, interconnection and operational relation, are equally possible and will be readily apparent to one of skill in the art.

Figure 5:
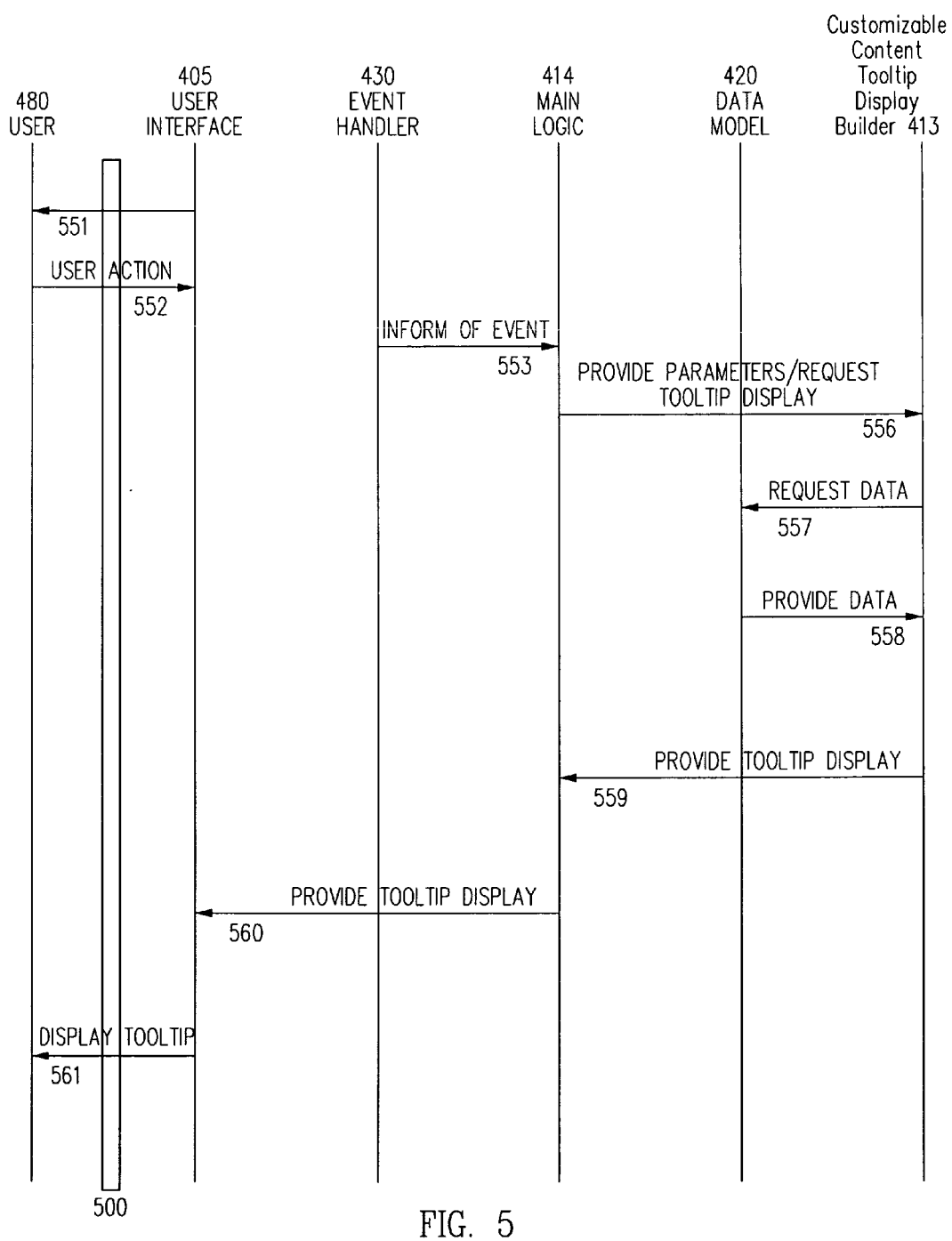
FIG. 5 is an interaction diagram illustrating interactions among system components according to one embodiment.

FIG. 5 is an interaction diagram illustrating interactions among system components according to one embodiment. User-system boundary 500 represents the division between the user 480 (FIG. 4) of the application for providing a customizable content tooltip, such as application for providing a customizable content tooltip 401, to the left of user-system boundary 500 (FIG. 5), and the components of the application for providing a customizable content tooltip, such as application for providing a customizable content tooltip 401 (FIG. 4), to the right of user-system boundary 500 (FIG. 5).

Viewing FIGS. 4 and 5 together, user interface 405 displays the appropriate interface to user 480 at 551. User 480 takes an action at 552 which is interpreted by user interface 405. Any number of interactions between user 480 and user interface 405 may occur before a customizable content tooltip, such as customizable content tooltips 381A/381B, 383A/383B, 387A/387B of FIGS. 3B, 3C, 3D, 3E, 3F, 3G, 3H, 3I, 3J, 3K, 3L, and 3M is generated. For example, user 480 can activate the customizable content tooltip by the means discussed above, including hovering a cursor over a selected item. In response, the application for providing a customizable content tooltip, such as application for providing a customizable content tooltip 401 of FIG. 4, redraws the customizable content tooltip so as to provide the desired customizable content tooltip.

When user 480 performs an action causing a customizable content tooltip display to be generated and displayed, event handler 430 informs main logic 414 at 553 of the occurrence of the user initiated event. Main logic 414 then determines the appropriate customizable content tooltip based on the user initiated event. Main logic 414 then sends a request to customizable content tooltip display builder 413 at 556 for the customizable content tooltip display. In one embodiment at 556 the request includes the appropriate editable content window data.

Customizable content tooltip display builder 413 requests any needed data, such as the customizable content tooltip display's parameters, from data model module 420 at 557. Data model module 420 then retrieves the requested data from data store 470 and provides the data to customizable content tooltip display builder 413 at 558. Based on this data, and the parameters provided within the customizable content tooltip display request, customizable content tooltip display builder 413 creates a customizable content tooltip display and provides the customizable content tooltip display to main logic 414 at 559. Finally, main logic 414 sends a request to user interface 405 to display the customizable content tooltip, and the customizable content tooltip display is displayed at 561.

It will be apparent to those of skill in the art that the conceptual components of FIGS. 4 and 5, and the relationships shown and discussed, represent one possible means of implementing the invention. One skilled in the art will also recognize that other arrangements and combinations of components, both physical and conceptual; can also be used to implement other embodiments, without departing from the characteristics of the invention as set forth in the claims below.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "activating", "editing", "storing", "changing", and "displaying" etc., refer to the action and processes of a computing system or similar electronic device that manipulates and operates on data represented as physical (electronic) quantities within the computing system memories, resisters, caches or other information storage, transmission or display devices, available at the time of filing or as later developed.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems, available at the time of filing or as later developed.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device, available at the time of filing or as later developed.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope set forth in the claims below.

In addition, the operations shown in the FIG.s are identified using a particular nomenclature for ease of description and understanding, but other nomenclature is often used in the art to identify equivalent operations.

In addition, the order of operations depicted in the FIG.s and discussed above was chose for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for providing a customizable content tooltip comprising:
displaying a customizable content tooltip in response to an activation of the customizable content tooltip, the customizable content tooltip comprising:
a customizable content tooltip first display content; and
a customizable content tooltip customization control, the customizable content tooltip customization control being displayed in the customizable content tooltip first display content the customizable content tooltip first display content including a list of attributes associated with a selected item linked to the customizable content tooltip;
activating the customizable content tooltip customization control;
in response to activating the customizable content tooltip customization control, providing an editable version of the customizable content tooltip first display content;
changing at least a portion of the customizable content tooltip first display content through the editable version of the customizable content tooltip first display content to create a customizable content tooltip second display content by adding an attribute to the customizable content tooltip first display content list of attributes or deleting an attribute from the customizable content tooltip first display content list of attributes;
saving the customizable content tooltip second display content;
activating the customizable content tooltip subsequent to saving the customizable content tooltip second display content;
displaying the customizable content tooltip upon activation of the customizable content tooltip, the customizable content tooltip comprising:
the customizable content tooltip second display content; and
a customizable content tooltip customization control, the customizable content tooltip customization control being displayed in the customizable content tooltip second display content.

2. The computing system implemented process for providing a customizable content tooltip of claim 1 wherein:
the customizable content tooltip first display content comprises text associated with a selected item linked to the customizable content tooltip, further wherein;
changing at least a portion of the customizable content tooltip first display content through the editable version of the customizable content tooltip first display content to create a customizable content tooltip second display content comprises changing the customizable content tooltip first display content text.

3. A system for providing a customizable content tooltip comprising:
a computing system; and
a processor for executing at least a portion of a process for providing a customizable content tooltip, the process for providing a customizable content tooltip comprising:
displaying a customizable content tooltip in response to an activation of the customizable content tooltip, the customizable content tooltip comprising:
a customizable content tooltip first display content; and
a customizable content tooltip customization control, the customizable content tooltip customization control being displayed in the customizable content tooltip first display content the customizable content tooltip first display content including a list of attributes associated with a selected item linked to the customizable content tooltip;
activating the customizable content tooltip customization control;
in response to activating the customizable content tooltip customization control, providing an editable version of the customizable content tooltip first display content;
changing at least a portion of the customizable content tooltip first display content through the editable version of the customizable content tooltip first display content to create a customizable content tooltip second display content by adding an attribute to the customizable content tooltip first display content list of attributes or deleting an attribute from the customizable content tooltip first display content list of attributes;
saving the customizable content tooltip second display content;
activating the customizable content tooltip subsequent to saving the customizable content tooltip second display content;
displaying the customizable content tooltip upon activation of the customizable content tooltip, the customizable content tooltip comprising:
the customizable content tooltip second display content; and a customizable content tooltip customization control, the customizable content tooltip customization control being displayed in the customizable content tooltip second display content.

4. The system for providing a customizable content tooltip of claim 3 wherein:

the customizable content tooltip first display content comprises text associated with a selected item linked to the customizable content tooltip, further wherein;

changing at least a portion of the customizable content tooltip first display content through the editable version of the customizable content tooltip first display content to create a customizable content tooltip second display content comprises changing the customizable content tooltip first display content text.

\* \* \* \* \*